Patented Nov. 7, 1933

1,934,033

UNITED STATES PATENT OFFICE 1,934,033

COMPOUND OF THE AROYL-O-BENZOIC ACID SERIES

Herman A. Bruson, Germantown, Pa., assignor to The Resinous Products & Chemical Co. Inc., Philadelphia, Pa.

No Drawing. Original application September 6, 1930, Serial No. 480,186. Divided and this application February 27, 1932. Serial No. 595,664

15 Claims. (Cl. 260—64)

This invention relates to the production of compounds of the aroyl-o-benzoic acid series and is a division of my copending patent application bearing Serial No. 480,186, filed Sept. 6, 1930 describing a broad class of oil-soluble metal salts useful as "siccatives for drying oils, paints and varnishes".

I have found that the polyvalent metal salts of organic acids having the general formula shown below possess the unusual properties of dissolving at 20–30° C. in raw linseed oil, China wood oil, soya-bean oil, and related oils as well as in turpentine, solvent naphtha, mineral spirits, gasoline, and in oil varnishes and paints. They may be incorporated readily in oil compositions such as linoleum, printing inks, oil enamels, varnishes, and the like in high proportions and are particularly stable at low temperatures and under most conditions of dilution or of oil-viscosity, and function as siccatives, hardening agents or gloss promoters in such compositions. When used as siccatives in oil enamels these salts do not produce "livering" or thickening with basic pigments and they show less tendency toward "after-yellowing" in white enamels than any siccatives at present known.

The new organic acids from which these polyvalent metal salts are derived, possess the general structure

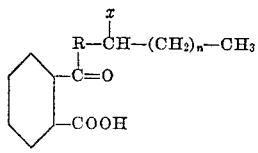

where R is an aromatic nucleus;

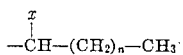

is an alkyl side chain substituent of R; "$x$" is hydrogen or an alkyl group, and "$n$" is a whole number greater than 1 (one). It is understood that R is attached to the C=O group through a nuclear carbon atom and furthermore that R can be an alkylated or hydrogenated aromatic nucleus and that it may contain a plurality of

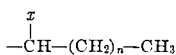

groups.

In order to lend clarity to the above expression, the following are examples of acids which I have synthesized and which belong to this class, it being understood that homologues and obvious equivalents thereof are included: n-butylbenzoyl-o-benzoic acid, n-amylbenzoyl-o-benzoic acid, sec.-amylbenzoyl-o-benzoic acid, di-sec.-amyl-benzoyl-o-benzoic acid, sec.-hexylbenzoyl-o-benzoic acid, sec.-octyl-benzoyl-o-benzoic acid, sec.-amyltoluyl-o-benzoic acid, sec.-octyl-toluyl-o-benzoic acid, sec.-amyl-xyloyl-o-benzoic acid, sec.-octyl-xyloyl-o-benzoic acid, sec.-amyl naphthoyl-o-benzoic acid, sec.-amyl tetrahydro-naphthoyl-o-benzoic acid, sec.-octyl naphthoyl-o-benzoic acid, and the like, it being understood that these acids may also be employed in the crude state or admixed with each other.

These acids may be readily obtained as resinous masses which crystallize only with great difficulty, by condensing phthalic anhydride with a suitable aromatic hydrocarbon (selected so as to form the group

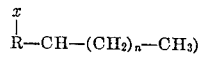

in the presence of a Friedel Crafts type of condensing agent, and hydrolyzing the reaction product; the method of preparation being analogous to that used in preparing p-toluyl-o-benzoic acid which is prepared commercially for use in manufacturing dyestuffs. An alternative and cheaper method of preparing these acids is that described by me in a copending patent application, bearing Serial No. 450,061, filed May 5, 1930. It is understood that acids made by either of these processes may be employed herein, the source being immaterial.

The alkylated derivatives of benzoyl-o-benzoic acid acids thus obtained are converted into their polyvalent metal salts as described in my copending application Serial No. 378,184, namely by treating their water-soluble alkali metal salts in aqueous solution with a water-soluble, neutral salt of a polyvalent metal; removing the precipitate, washing it free from inorganic impurities, and drying preferably in vacuo. The salts obtained form resinous, friable masses which dissolve readily at room temperature (20–30° C.) in turpentine, raw linseed oil, varnish makers' naphtha, and other organic solvents. All of the polyvalent metal salts of the acids having the general formula given above are compatible with nitro-cellulose and may be used as synthetic resins in conjunction therewith. Such lacquer compositions have already been described in a co-pending patent application bearing Serial No. 471,420, filed July 28, 1930.

As illustrating the method of practicing my present invention the following examples are given.

Example 1

148 grams of phthalic anhydride is mixed with 740 grams of sec.-amylbenzene in a vessel fitted with an agitator and 296 grams anhydrous aluminum chloride added in small portions at a time so that temperature of the reaction mass does not exceed 25° C. The mixture is then stirred continuously for 4 to 5 hours and is then warmed to 45° C. for 5 hrs. The dark brown reaction product is decomposed with ice water or by means of hot soda solution. By the latter procedure, the alumina which forms is filtered off after the mixture has been steam distilled to remove unreacted hydrocarbon, and the filtrate is acidified with dilute sulfuric acid. The sec.-amylbenzoyl-o-benzoic acid separates as a waxy mass which need not be purified for the second step of the process.

After washing, the crude waxy acid is carefully neutralized with a 10% sodium hydroxide solution until faintly pink to phenolphthalein indicator, and is then treated with a slight excess of a 20% aqueous solution of a water soluble salt of the polyvalent metal desired. For this purpose, cobaltous sulfate, manganous chloride, lead nitrate, aluminum sulfate, cerium nitrate, chrome alum, copper sulfate, and the like may be used. The corresponding polyvalent metal salt of sec.-amylbenzoyl-o-benzoic acid precipitates out as an amorphous mass. This may be purified by dissolving in an organic solvent such as toluene, ethylene dichloride, acetone, or other suitable, volatile organic solvent, filtering the solution to remove insoluble impurities, and finally evaporating off the solvent.

I have found it advantageous to carry out the double decomposition reaction described above in a two-phase system; one layer being ethylene dichloride and the top layer being an aqueous solution of the neutral sodium-sec.-amylbenzoyl-o-benzoate. When a solution of a polyvalent metal salt, for example cobalt sulfate, is added to the above system and the mixture shaken, the neutral cobalt sec.-amylbenzoyl-o-benzoate which forms in the aqueous layer is immediately redissolved by the ethylene dichloride and wanders therefore into the lower layer which becomes colored deep blue. The ethylene dichloride layer is then run off, and is washed with water, filtered, and subjected to steam distillation to recover the solvent. The cobalt salt which remains is then dried in vacuo at 100° C. and forms a deep blue amorphous mass suitable for use as a powerful siccative for drying oil compositions. Instead of ethylene dichloride, one may use toluene, carbon tetrachloride or other volatile organic solvent which forms a two-layer system with water.

The aluminum, barium, calcium, lead, cerium, magnesium, strontium, and zinc salts of sec.-amyl-benzoyl-o-benzoic acid are white, whereas the chromium, cobalt, copper, iron and vanadium are colored. All of the polyvalent metal salts of this acid are readily soluble in aromatic hydrocarbons, mineral oils, vegetable and animal oils, turpentine, esters, ketones, ethers, glycol ethers, and in certain alcohols such as butanol. They are best incorporated in oils, paints, varnishes, oil enamels, printing inks, linoleums, and the like by dissolving in an appropriate solvent, turpentine or naphtha for example, and adding the solution thus obtained to the oil composition, which may contain in addition certain resins, pigments, and solvents as ordinarily used in varnish practice. Oils and varnishes of the linseed oil type when mixed with the above cobalt, manganese, or vanadium salts corresponding to .05% metal upon the weight of the oil decrease the drying time from 24 hours to approximately 6 hours. Mixtures of the cobalt and lead, manganese and lead, or cobalt and cerium salts accomplish the same result. Other similar mixtures of polyvalent salts may be employed as siccatives if desired. These salts also act as rapid oxidation catalysts.

Example 2

Instead of using sec.-amylbenzene in the above described condensation, one may use an equivalent amount of sec.-octylbenzene. The reaction product is worked up in an analogous manner.

The crude sec.-octylbenzoyl-o-benzoic acid obtained forms a yellowish, waxy mass which is worked up into its polyvalent metal salts as described in Example 1. These salts possess a greater degree of solubility in mineral spirits and in linseed oil, than do the corresponding polyvalent metal salts of sec.-amylbenzoyl-o-benzoic acid.

In the same way one may condense other alkylated aromatic hydrocarbons in which at least one alkyl substituent contains more than 3 carbon atoms in a normal, straight chain, with phthalic anhydride in the presence of condensing agents of the Friedel-Crafts type ($AlCl_3$, $FeCl_3$, $SnCl_4$, $AlBr_3$, etc.) to obtain upon hydrolysis, new resinous acids whose polyvalent metal salts have the above described properties. Satisfactory hydrocarbons for this purpose which I have synthesized and condensed with phthalic anhydride as above are the following.

N-butylbenzene, N-amylbenzene, sec.-amylbenzene, di-sec.-amylbenzene, sec.-hexylbenzene, sec.-octylbenzene, sec.-amyltoluene, sec.-octyltoluene, sec.-amyl-m-xylene, sec.-octyl-o-xylene, sec.-amyl-ethylbenzene, sec.-amyl cymene, sec.-amyl naphthalene, sec.-amyltetrahydro-naphthalene, and sec.-octoylnaphthalene.

It is obvious that homologues and isomers of these hydrocarbons are herein included as well as their halogenated, hydrogenated, and hydroxylated derivatives (phenols) but in general I have found it preferable to use the alkylbenzene hydrocarbons notably amylbenzene. A satisfactory amylbenzene for this purpose is readily prepared by condensing amylalcohol ("Pentasol") with benzene in the presence of a dehydration catalyst such as concentrated sulphuric acid or anhydrous zinc chloride. Alternative methods of preparation are to condense amylchloride with benzene using anhydrous aluminum chloride as a catalyst or to condense amylene with benzene using sulfuric acid or zinc chloride as a condensing agent. The other hydrocarbons are readily prepared in an analogous manner for this purpose.

I have found that the length of the chain of the alkyl substituent in the benzene, toluene, xylene, or naphthalene nucleus R, is the deciding factor for determining the degree of oil-solubility of the polyvalent metal salts obtained therefrom, i. e. as "$n$" increases the oil-solubility of the polyvalent salts increases. Furthermore, if more than one alkyl side chain is present in R, for example when R is sec.-amyltoluene, or sec.-amylxylene, the oil-solubility of the polyvalent metal salts is greater than that of the salts derived from sec.-amylbenzene. In general, the introduction of more than one $$\overset{x}{\underset{}{C}}H-(CH_2)_n-CH_3$$

group in R increases the oil-solubility of said salts.

Furthermore, if the alkyl group in R contains less than three carbon atoms in a normal chain, such as is exemplified by iso-propyl-benzoyl-o-benzoic acid, cymoyl-o-benzoic acid, ethyl benzoyl-o-benzoic acid, or if R contains no alkyl group whatever; the polyvalent metal salts are more difficultly soluble in cold mineral thinners or cold drying oils, and can only be incorporated directly, by heating as described in my co-pending patent application, Serial No. 378,184.

The present process however yields neutral polyvalent metal salts having a higher degree of solubility in drying oils and in solvents of non-coal tar origin.

It is obvious that deviations in proportions, temperatures, and choice of solvents may be employed along the lines of this invention without departing from its scope.

What I claim as new is:

1. An organic ketonic, monobasic acid having the general formula

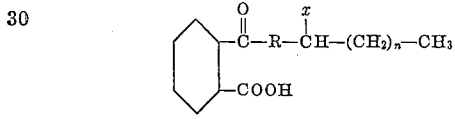

wherein R is an aromatic hydrocarbon radical, a nuclear carbon atom of which is attached directly to the carbon atom of the C=O group, "$x$" is hydrogen or an alkyl group, and "$n$" is a whole number greater than 1 (one).

2. An organic ketonic, monobasic acid having the general formula

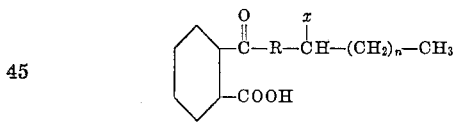

wherein R is a benzene nucleus, a nuclear carbon atom of which is attached directly to the carbon of the C=O group, "$x$" is hydrogen or an alkyl group, and "$n$" is a whole number greater than 1 (one); characterized by the solubility of its polyvalent metal salts in drying oils and aliphatic hydrocarbons.

3. An acid of the group consisting of n-butyl-benzoyl-o-benzoic acid, sec.-hexylbenzoyl-o-benzoic acid, sec.-octylbenzoyl-o-benzoic acid, sec.-amyltoluyl-o-benzoic acid, sec.-octyl-toluyl-o-benzoic acid, sec.-amyl-xyloyl-o-benzoic acid and sec.-amyl naphthoyl-o-benzoic acid, said acid being characterized by the solubility of its polyvalent metal salts in drying oils and aliphatic hydrocarbons.

4. Sec.-hexylbenzoyl-o-benzoic acid.

5. Sec.-octylbenzoyl-o-benzoic acid.

6. The process for preparing organic acids whose polyvalent metal salts are oil soluble, which comprises condensing phthalic anhydride in the presence of anhydrous aluminum chloride with an alkylated aromatic hydrocarbon, the alkyl group of which contains at least three carbon atoms in a normal straight chain; and thereafter hydrolyzing the product.

7. The process for preparing acids whose polyvalent metal salts are oil-soluble, which comprises condensing phthalic anhydride in the presence of anhydrous aluminum chloride with an alkylated benzene hydrocarbon the alkyl group of which contains at least three carbon atoms in a normal straight chain, and thereafter hydrolyzing the product.

8. The process for preparing sec.-octylbenzoyl-o-benzoic acid which comprises condensing sec.-octylbenzene with phthalic anhydride in the presence of anhydrous aluminum chloride and hydrolyzing the product.

9. The process for preparing sec.-hexylbenzoyl-o-benzoic acid which comprises condensing sec.-hexylbenzene with phthalic anhydride in the presence of anhydrous aluminum chloride and hydrolyzing the product.

10. The process for preparing organic acids whose polyvalent metal salts are oil soluble, which comprises condensing phthalic anhydride in the presence of a Friedel-Crafts type of catalyst with an alkylated aromatic hydrocarbon of which at least one alkyl group contains more than two carbon atoms in a normal straight chain, and thereafter hydrolyzing the product.

11. An organic ketonic, monobasic acid having a general formula

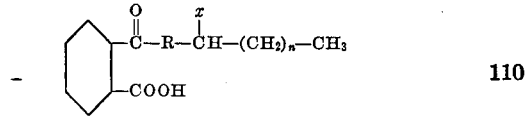

wherein R is an aromatic nucleus of the series consisting of benzene and naphthalene, a nuclear carbon atom of which is attached directly to the carbon atom of the C=O group, "$x$" is hydrogen or an alkyl group, and "$n$" is a whole number greater than 1 (one).

12. The process for preparing organic acids whose polyvalent metal salts are oil soluble, which comprises condensing phthalic anhydride in the presence of anhydrous aluminum chloride with an alkylated aromatic hydrocarbon of the series consisting of benzene and naphthalene, the alkyl group of which contains at least three carbon atoms in a normal straight chain; and thereafter hydrolyzing the product.

13. The process for preparing organic acids whose polyvalent metal salts are oil soluble which comprises condensing phthalic anhydride in the presence of a Friedel-Crafts type of catalyst with an alkylated aromatic hydrocarbon of the series consisting of benzene and naphthalene of which at least one alkyl group contains more than two carbon atoms in a normal straight chain; and thereafter hydrolyzing the product.

14. The process for preparing amylbenzoyl-o-benzoic acid which comprises condensing amylbenzene with phthalic anhydride in the presence of reacting proportions of anhydrous aluminum chloride and hydrolyzing the product.

15. A polyalkylbenzoyl-o-benzoic acid in which at least one alkyl group contains more than three carbon atoms.

HERMAN A. BRUSON.